Aug. 6, 1957    I. MULATTI ET AL    2,801,649
SHUTTLE-LOADING DEVICE FOR AUTOMATIC LOOMS FOR WEAVING
Filed Jan. 30, 1953    6 Sheets-Sheet 1

Inventors:
Ivano Mulatti
Luigi Cremonini
by Singer, Stern & Carlburg
Attorneys

Aug. 6, 1957  I. MULATTI ET AL  2,801,649
SHUTTLE-LOADING DEVICE FOR AUTOMATIC LOOMS FOR WEAVING
Filed Jan. 30, 1953  6 Sheets-Sheet 3

Inventors:
Ivano Mulatti
Luigi Cremonini
by Singer, Stern & Carlberg Attorneys Aug. 6, 1957     I. MULATTI ET AL     2,801,649
SHUTTLE-LOADING DEVICE FOR AUTOMATIC LOOMS FOR WEAVING
Filed Jan. 30, 1953     6 Sheets-Sheet 5

United States Patent Office 2,801,649
Patented Aug. 6, 1957

2,801,649

SHUTTLE-LOADING DEVICE FOR AUTOMATIC LOOMS FOR WEAVING

Ivano Mulatti and Luigi Cremonini, Nogara, Italy, assignors to Soc. Coll. Adriano Gardella & F.llo, Genoa, Italy, an Italian company Application January 30, 1953, Serial No. 334,206

Claims priority, application Italy April 10, 1952

12 Claims. (Cl. 139—243)

The present invention relates to automatic weaving looms in which coreless or solid cops are disposed in a shuttle and shorten in length as the weft is drawn therefrom.

In known looms of this kind the shuttle is usually loaded after the cop has been completely exhausted, so that the weft thread inserted during the last shuttle pick is generally shorter than the width of the warp shed. This incomplete weft constitutes a serious defect in the woven cloth, especially when weaving thick threads such as jute, hemp or flax.

In order to overcome the above drawback, automatic cop loaders have been proposed which are caused to operate before the complete exhaustion of the weft supply in the shuttle, but after the cop remnant in the shuttle is reduced to a minimum length. In such known devices the weft thread is severed between the shuttle eye and the woven cloth, the cop remnant is withdrawn from the shuttle and the empty shuttle traverses the warp shed without weft yarn once or several times before a new cop is introduced into the shuttle. The main drawback of these known devices is that the shuttle traverses the shed without yarn, so that during such shuttle throws it is necessary to stop feeding the warp and to put the weft fork out of action.

In one known shuttle loading mechanism for use in looms of the above kind a shuttle loading device is provided on one side of the warp shed and on the other side of the shed a device is provided which feels the cop in the shuttle and when it detects a minimum cop length releases a cop remnant extractor and weft cut-off device on the same side of the shed to extract the cop remnant and cut off the weft from the remnant during a single movement of the slay. The shuttle is reloaded at the end of its next pick i. e. on the other side of the shed. In this mechanism the reloading operation is effected in two beats of the slay and the detection of minimum cop length in the shuttle, extraction of the cop remnant from the shuttle, and cutting off the weft is effected in one beat of the slay. In modern looms the movement of the slay is so fast that with such a mechanism the moving parts of the shuttle loading mechanism have to be made very accurately and to be adjusted with careful precision in the necessary timed relation if such a mechanism is to operate over long periods at high loom speeds without jamming.

The object of the present invention is to provide a shuttle loading mechanism of the above kind which will operate smoothly without any substantial risk of jamming at any loom speed currently employed and will effect the reloading of the shuttle without putting the weft fork out of action and without the shuttle traversing the shed wihout a weft thread or with a short weft thread.

According to the present invention in a shuttle loading mechanism of the above kind there is the provision on one side of the loom, adjacent to a shuttle box on the loom slay, of a loading device disposed to introduce full cops into the shuttle and a cop feeling device disposed to detect when the length of the cop remnant in the shuttle is reduced to a predetermined minimum, and on the other side of the loom, adjacent a second shuttle box on the slay, of a device for extracting the cop remnant from the shuttle and a device for severing the weft thread from the extracted cop remains so as to leave in the shuttle a length of weft not less than the width of the warp shed, the arrangement being such that on displacement of the feeling device when it detects a cop remnant of the predetermined minimum length in the shuttle, the feeling device disposes the extracting device for extracting the cop remnant during one beat of the slay, the extractor extracts the cop remnant from the shuttle and the weft is severed by the severing device during a second beat of the slay, and the new cop is loaded into the shuttle and the whole shuttle loading mechanism is returned to the normal weaving disposition during a third slay beat, so that the shuttle does not traverse the slay empty.

In order that the invention may be more clearly understood one construction of a shuttle loading mechanism in accordance therewith will now be described by way of example with reference to the accompanying drawings in which.

In the drawings the same numerals are used to refer to the same parts.

Figure 1:
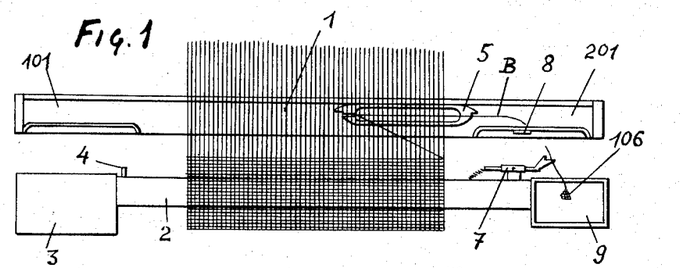
Fig. 1 is a diagrammatical plan view of the breast beam and the slay of a loom provided with the mechanism according to the invention.

Referring to Fig. 1, 1 and 2 indicate respectively the slay and the breast beam of the loom. On one side of the breast beam 2, adjacent a shuttle box 101 on the slay 1, a cop-loading device 3 and a cop feeler 4, are fitted. On the opposite side of the breast beam 2, facing a box 201 on the slay 1 an extractor 7 is disposed for the extraction of the remnant 106 of the weft cop from the shuttle 5 and a cutting device 8, for example a scissors blade or the like, is disposed for severing the weft thread B between the extracted cop remnant 106 and the shuttle 5, as described below.

The arrangement of the slay 1, cop feeler 4, extractor 7, and the cutting device 8 is such that when the length of the cop in the shuttle is reduced to a predetermined minimum, the feeler 4 on a beat-up movement of the slay and when the shuttle is in the box 101, enters the shuttle and, owing to the reduced cop length, penetrates into the shuttle a sufficient distance to enable it, as described hereafter, to set a mechanism to operate the extractor 7 and the cutting device 8 when the shuttle has traversed the shed. During the successive back and forward movement of the slay the shuttle 5 moves into the box 201 on the opposite side of the slay; the extractor 7 is then operated by the said mechanism to grasp and eject the cop remnant 106 from the shuttle 5 and throw it into a collecting box 9. At the same time, or successively, the cutter 8 severs the weft thread B between the extracted cop remnant 106 and the shuttle 5, so that a length of weft thread remains connected to the shuttle by passage through the shuttle eye, the length of thread being sufficient to enable the shuttle during its succeeding throw across the shed, without a cop, to insert a complete length of weft into the warp shed before the empty shuttle enters the box 101 on the cop loading side of the loom. On the next beat-up of the slay, the cop-loading device 3 is operated by mechanism to be described, whereby a full cop is loaded into the shuttle while in the box 101. Thus the cycle of the loading of the shuttle is completed without effecting even a single traverse of the empty shuttle across the shed and without having stopped any part of the loom.

Figure 2:
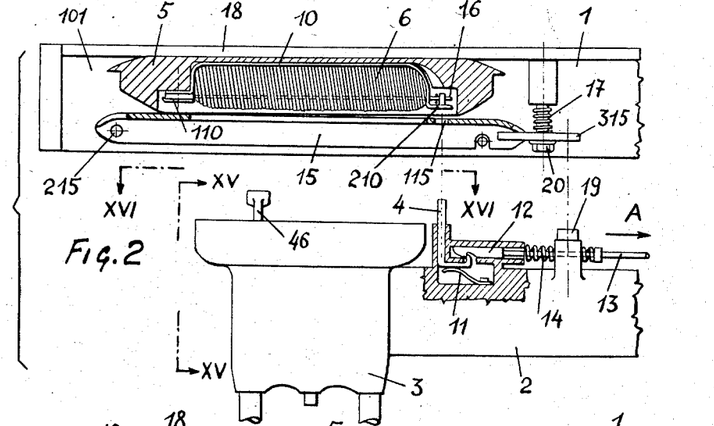
Fig. 2 is a plan view, with parts in section, of the shuttle-loading device and of the cop feeling device as they are disposed in the mechanism when a full cop is loaded in the shuttle and the slay is in its backward position.
Figure 3:
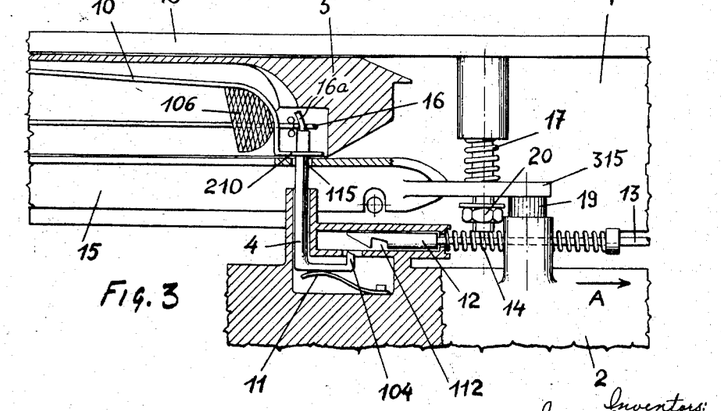
Fig. 3 shows in plan and on a larger scale the cop feeling device in the position it occupies when the cop is almost exhausted with the slay in forward position.

Referring to Figs. 2 and 3 the cop feeler is shown, which is sensible to the length of the weft cop remnant 106 within the shuttle 5. The feeler 4 in the form of a pin or rod is slidably mounted on the beam 2 at right angles to the slay 1 and is urged towards the slay by a spring 11. The feeler 4 is provided with a tooth 104 normally in engagement with a notch 112 in a plunger 12 fastened to rod 13 and urged, together with the rod 13, in the direction of the arrow A (Fig. 3) by the action of the spring 14 (Figs. 2 and 3). At each beat-up of the slay 1, the feeler 4 enters the box 101 and passes through a bore 115 in the front side 15 of the box 101 so that at each second beat of the slay 1, the feeler 4 penetrates partially into the shuttle 5 opposite a small plate 210 carried by at least one springy longitudinal arm 10 fitted within the shuttle against its rear side and fastened thereto at 110. Each arm 10 is disposed so that by its springy nature it tends to be urged away from the rear wall of the shuttle and the plate 210 occupies a forward position, in which it may abut against the feeler 4. When a full cop 6 is introduced into the shuttle 5, the arm 10 is pressed by the cop against the rear face of the shuttle and is maintained in that position by the frictional resistance between the cop 6 and the shuttle walls. The plate 210 is thus held to the rear and cannot abut, during the slay beats, against the feeler 4, which therefore holds the plunger 12 and rod 13 in the latched position shown in Fig. 2.

The weft cop 6 is of the solid or coreless type and as the thread is drawn therefrom it shortens in length from the left in Fig. 3. The frictional resistance between the cop and the shuttle walls prevents forward movement of the arm 10; as the cop shortens in the shuttle this arm 10, during the slay beats, moves forward within the shuttle owing to its elastic nature. A snap latch 16 on the shuttle body engages the projection 16a on the arm 10 when the arm reaches its forward position in the shuttle. The whole is so dimensioned that when the weft cop is reduced to a very small predetermined length 106 and the arm 10 reaches its forward position i. e. of maximum clearance from the rear shuttle side, and the arm is locked by means of the snap latches 16, 16a the plate 210 is fixed in such a position that, when the slay next approaches the beam, the plate 210 abuts against the feeler 4 as in Fig. 3. The feeler 4 is thus pushed forwards against the spring 11 and withdraws the tooth 104 from the notch 112 of the plunger 12 which thus, by action of the spring 14, moves rapidly in the direction of the arrow A. The rod 13 extends across to the opposite side of the breast beam 2 to control the movements of both the extractor 7 and the severing device 8, as will be seen hereinafter.

In order to position the shuttle 5 always exactly at the same distance from the feeler 4 during the slay beats, the forward side 15 of the box 101 is fulcrumed at 215 on the slay 1 and is normally positioned (by means of a spring 17 and a suitable abutment 20) at such a distance from the rear side 18 of the box 101 as to permit the free movement of the shuttle into and out of the box 101 with the necessary tolerance (Fig. 2). On the breast beam, a spring abutment 19 (for example a rubber pad) is provided which, at each slay beat, abuts against the free end 315 of the swinging front side 15 of the box 101 and shifts this side 15 against the action of the spring 17 and at the same time temporarily grips the shuttle 5 against the rear side 18 of the box 101 (Fig. 3).

Figure 4:
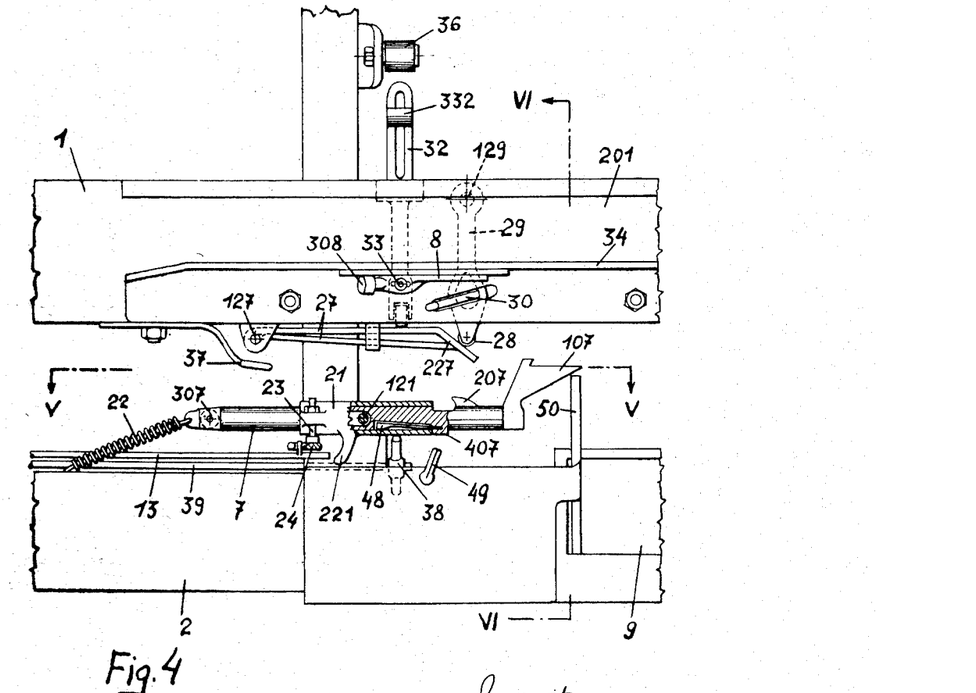
Fig. 4 is a general plan view of the cop remnant extracting and weft thread severing devices of the mechanism.
Figure 5:
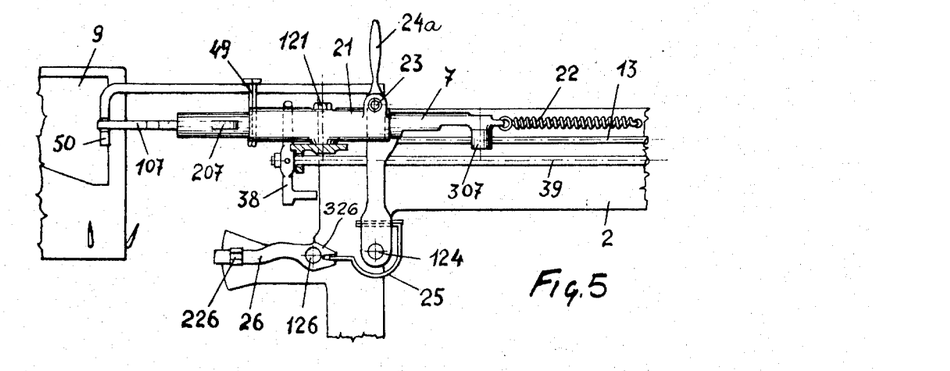
Fig. 5 is an elevation of the cop remnant extracting device, as seen along the line V—V of Fig. 4.
Figure 6:
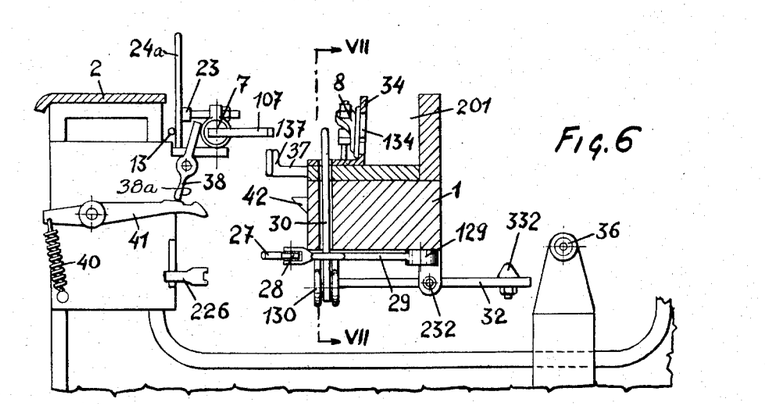
Fig. 6 is a section on the line VI—VI of Fig. 4.
Figure 7:
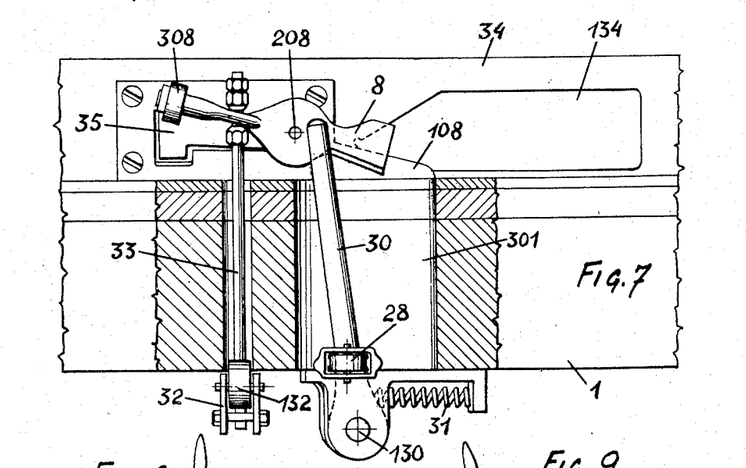
Fig. 7 is a section through the slay, on the line VII—VII of Fig. 6.
Figure 8:
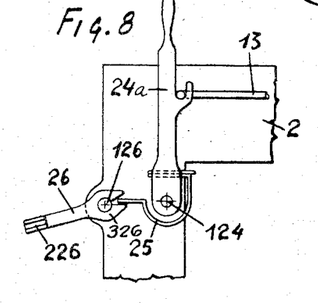
Figs. 8 and 9 are detail views of part of the cop remnant extracting device in two different working positions.
Figure 9:
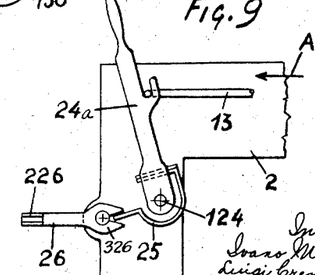
Figure 10:
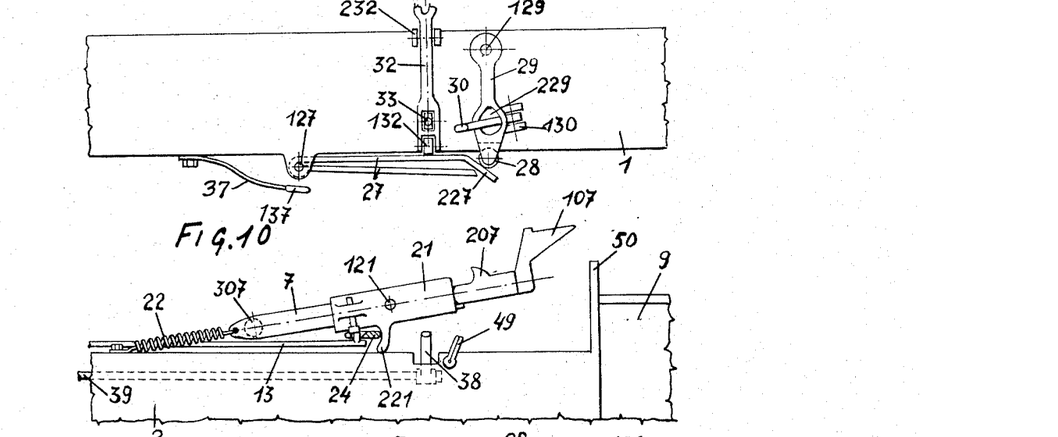
Figs. 10, 11 and 12 show in plan view with parts in section the operation of the cop remnant extracting device.
Figure 11:
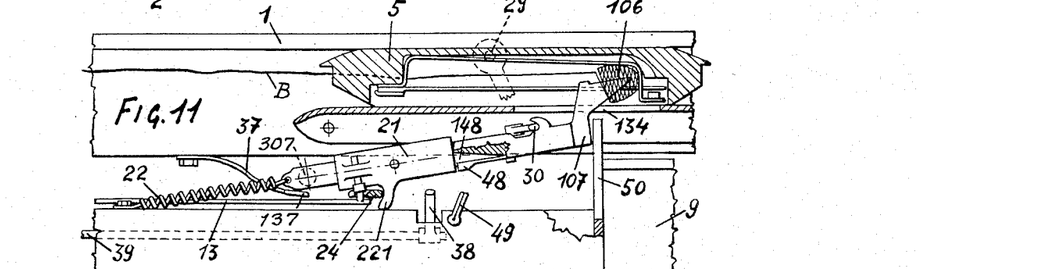

In Figs. 4 to 14 inclusive are shown the extractor 7 and its operating mechanism for extracting the weft cop remnant 106 from the shuttle 5 and the cutter 8 with its operating mechanism for severing the weft thread, the extractor 7 and the cutter 8 being both fitted on the loom side opposite to that of the cop loader 3 and the cop feeler 4. The extracting device comprises the extractor 7 in the form of an arm slidably mounted axially in a swinging bearing bushing 21 fulcrumed at 121 to the breast beam 2. The end of the extractor arm 7 faces away from the shed and is provided with a point 107 and a tooth 207; the other end of the arm 7 carries a roller 307 and is connected to the breast beam 2 by a spring 22. The spring 22 holds the arm 7 normally withdrawn towards but not in the warp shed and at its innermost position an abutment member 407 (Fig. 4) on the arm 7 engages the bearing bushing 21 and tends to rotate it about the fulcrum 121 towards an inclined position with respect to the slay 1, as shown in Figs. 10 and 11. In its rest position, the bushing 21 however is maintained substantially parallel to the slay 1 because an adjustable abutment member 23 thereon bears against a vertical lever 24 (Figs. 4 and 6).

A spring tooth 48 (Figs. 4, 11 and 12) is constrained within a groove 148 in the arm 7, but this tooth tends to snap out of the groove 148. In its normal position the spring tooth 48 is compressed within the groove 148 by the bearing bushing 21 (Fig. 4). When the arm 7 is pulled outwardly against the action of spring 22, to the right as shown in Fig. 11, as will be described, the tooth 48 is pulled out of the bushing 21, snaps out of its groove 148 and, by coacting with the edge of the bushing 21 (Fig. 12), prevents the arm 7 from returning to its normal position in the bushing.

A lever 24 is fulcrumed at 124 to the loom frame with its free end in proximity to a nose 221 on the bushing 21 (Fig. 4) and is hinged to the rod 13. The lever 24 carries an arm 25 which engages in the forked end 326 on the end of a lever 26; the lever 26 has a bifurcated end 226 and is fulcrumed at 126 on the loom frame so that its bifurcated free end 226 projects towards the slay 1 (Figs. 5, 6, 8, 13 and 14). On the side of the slay 1 facing the shed, a longitudinal arm 27 is pivoted at 127 (Figs. 4, 6, 10, 13 and 14) for co-operating with the end 226 of the lever 26. Normally the end 226 of the lever 26 remains out of the path of the arm 27 (Figs. 4, 6, and 14); when the plunger 12 and the rod 13 move in the direction of the arrow A (Fig. 3), the lever 24 is also moved and tilts the lever 26, as may be seen in Figs. 5, 8, 9 and 13, and on a beat-up of the slay the arm 27 engages in the bifurcated end 226 of the lever 26. The lever 24 has a handle 24a for manual operation of the extractor arm 7 to assist in setting up the mechanism before weaving is commenced and to assist in the adjustment of the mechanism if required during weaving operations.

The free end 227 of the arm 27 is inclined and bears against a roller 28 pivoted on the forward end of a lever 29 (Figs. 4, 6, 7, 10, 11 and 12) fulcrumed at 129 on the slay 1 and swinging in a substantially horizontal plane. A substantially upright vertical lever 30 is passed through an eye 229 of the lever 29. The lever 30 is fulcrumed at 130 to the slay 1, passes through the vertical slot 301 on the upper side of the slay, and is urged by a spring 31 towards a position in the slot 301 nearest to the warp shed. In this position the upper free end of the lever 30 moves at each slay beat, up to but not in contact with the tooth 207 of the arm 7 (Figs. 4 and 10). When, by the movement of the slay 1 towards the breast beam, the arm 27 abuts against the end 226 of lever 26, the arm 27 turns backwards about its fulcrum 127 and with its inclined end 227 pushes the lever 29 aside away from the shed. The lever 29 carries with it the upright lever 30 which is swung outwardly in an inclined direction with respect to the front face of the slay 1 (Figs. 10 and 11). By movement of the slay away from the breast beam, the levers 29 and 30 are returned by the spring 31 to their position shown in Fig. 4.

Figure 13:
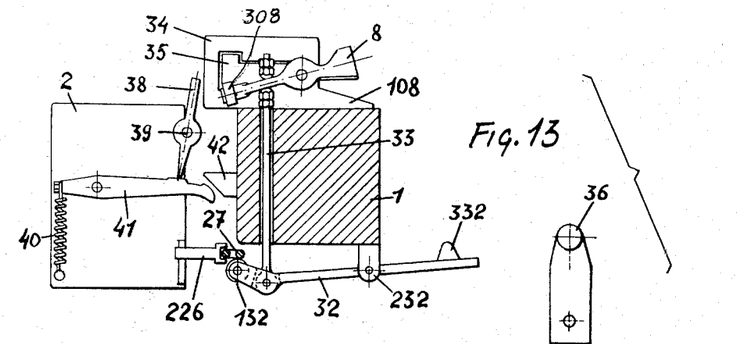
Figs. 13 and 14 are two views similar to Fig. 6, but with the weft thread severing device turned through 90° and brought into the plane of the drawing.

The arm 27 further abuts against the front end of a lever 32 (which may have a sloped end or as shown in the drawings it may have a roller on it) fulcrumed at 232 to the slay 1 and linked by means of an upright rod 33 to the movable cutter 8 of the scissors 8—108 fulcrumed at 208. The scissors are mounted in registry with an aperture 134 in the side 34 of the box 201 (Figs. 4, 6, 7, 13 and 16). The movable cutter 8 carries roller 308 in engagement with a spring blade 35 (Figs. 7, 13 and 14) which tends to retard movement of the cutter 8. The scissors 8—108 are normally closed (Figs. 7 and 14) and are opened as the slay beats when the arm 27 abuts against the end 226 of the lever 26 and is pushed back on the roller 132, thus pushing down the outer end of lever 32 and with this, through rod 33, the portion of the cutter 8 having the roller 308 thereon (Fig. 13). The cutter 8 is held in this opened position by pressure of the spring blade 35 on the roller 308. The scissors 8—108 are closed by the rearward movement of the slay 1 as it beats since during this slay movement the rear end 332 of the lever 32, which was lifted by the opening of the scissors, is again depressed by an adjustable abutment 36 provided on the loom frame (Figs. 4, 6, 13 and 14).

Figure 12:
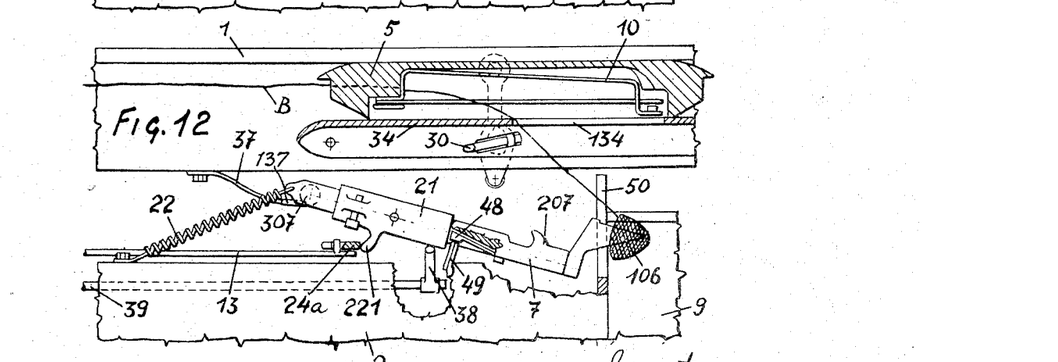
Figure 14:
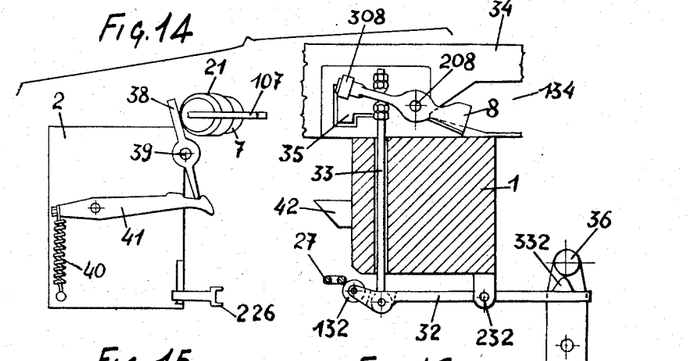
Figure 15:
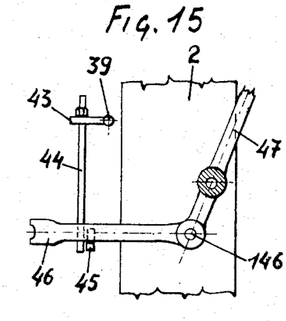
Figs. 15 and 16 show, in elevation on the lines XV—XV, XVI—XVI respectively of Fig. 2, the cop-loading control mechanism.
Figure 16:
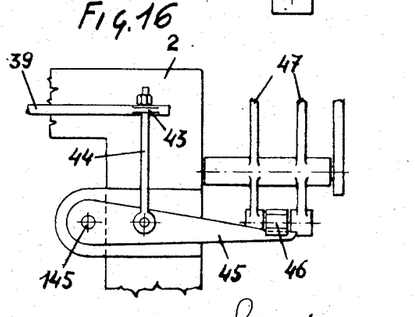

On the slay 1 a fixed front arm 37 is provided and disposed so that on movement of the slay towards the beam 2 it passes under the extractor 7. The arm 37 has an upstanding abutment which as will be described engages the roller 307 when the extractor 7 is advanced to enter the box 201. On the breast beam 2, in line with the bearing bushing 21, a lever 38 is mounted the upper end of which normally bears against the bushing 21. The lever 38 is keyed on the rod 39 extending along the breast beam 2 to the loader 3 on the opposite loom side. On the end 38a of the lever 38 remote from the bushing 21 a stop lever 41 is provided which is pressed by a spring 40 and is adapted to coact during the slay beats with an inclined abutment 42 on the slay 1 (Figs. 6, 13 and 14). In the normal position of the levers 38 and 41 (shown in Figs. 6 and 13) the abutment 42 does not come into contact with the lever 41. When the arm 7 is swung forwards, as shown in Fig. 12, it pushes the lever 38 and causes it to be swung so that its lower end 38a snaps into a notch in the lever 41 thus locking the lever 38 and shifting the lever 41 into a position in which the lever 41 will engage the abutment 42 during the subsequent slay beat (Fig. 14). The lever 38 by being swung, causes the rod 39 to be swung through the same angle; the rod 39 is in turn connected on the loading side of the loom, to a lever 45 through a mechanism comprising a radial arm 43 (Figs. 15 and 16) and a connecting rod 44; the lever 45 is fulcrumed at 145 to the loom frame and carries on its free end a lever 46 (see also Fig. 2) hinged at 146 to a lever 47 which controls the loader 3 for the introduction of a full cop into the shuttle. The lever 46 coacts with a corresponding abutment member (not shown) on the slay and usually, i. e. when the lever 38 and the rod 39 are in the rest position, moves clear of the path of said abutment member. On the other hand the lever 46 is raised as shown in the drawings in front of said slay abutment by the swinging movement of the lever 38 and the corresponding pivotal movement of the rod 39.

The operation of the above described shuttle loading mechanism is as follows:

The rest position of all members is that shown in Figs. 2, 4, 5, 6, 7, 8, 15 and 16. The cop feeler 4 detects the shortening of the weft cop 6 and when this has reached a minimum predetermined length causes the rod 13 to snap in the direction of the arrow A at a given (first) slay beat. The lever 24 is shifted by the rod 13 from the position shown in Figs. 5 and 8 to that shown in Figs. 9, 10 and 11, thus tilting the lever 26 so that the end 226 of the lever 26 is brought in registry with the lever 27. By this shifting of the lever 24, the bushing 21 is no longer supported and is turned by the spring 22 into a position inclined with respect to the slay 1, as shown in Fig. 10. By the successive (second) beat of slay 1, during which the shuttle moves into the box 201 on the extractor side of the loom (Figs. 11 and 12), the arm 37 moves under the extractor 7 while the lever end 226 abuts against the lever 27 and this, by swinging backwards, depresses the lever 32 and opens the scissors 8—108 (Fig. 13); at the same time by acting on the lever 29 the lever end 226 causes the lever 30 to be swung outwardly. The lever 30 by means of the tooth 207 engages and pulls the extractor arm 7 outwardly i. e. away from the shed, thus passing the point 107 thereof through the aperture 134 on the side 34 of the box 201 in the shuttle 5 and into the central hole of the cop remnant 106 (Fig. 11). The roller 307 of the extractor 7 is thus aligned with abutment 137 on the arm 37, while the extractor arm 7 is locked with respect to the bushing 21 by the spring tooth 48 (Fig. 11). By the rearward movement of the slay 1, the abutment 137 on the arm 37 engages with the roller 307 and by withdrawing the roller 307 back causes the arm 7 in the bushing 21 to be swung about the fulcrum 121 thus bringing the point 107 forwards. The point 107 thus extracts the weft cop remnant 106 from the shuttle and transfers it to the collecting box 9, by passing it between the arms of the fork 50 (Fig. 12). By the same oscillation of the extractor arm 7 and the bushing 21, the lever 24 is pushed by the projection 221 in a direction opposite to that of the arrow A and is brought into the rest position in which it is locked due to the snapping of the tooth 104 into the notch 112 of the plunger 12 on the loading side of the loom (Fig. 2). At the same time the lever 38 is shifted so that, by rotating the rod 39, the lever 38 brings the control lever 46 of the loader 3 into the working position, and locks it in this position by the action of the stop lever 41 (Figs. 12 and 14).

At the end of the swinging movement of the extractor arm 7 and the bushing 21, the fixed abutment 49 pushes the spring tooth 48 into its housing (Fig. 12) and causes both the extractor 7 and the bushing 21 to snap in their starting positions (Fig. 4) by action of the spring 22. The cop remnant 106 is taken from the point 107 of the extractor by action of the fork 50 and falls into the box 9. The weft thread which is engaged in the shuttle eye comes between the scissor blades 8—108 (Fig. 12) which have remained opened by action of the spring blade 35 on the roller 308. As said, the weft thread is to be cut at such a point in its length between the shuttle eye and the remnant 106 as to leave in the shuttle a thread whose length is sufficient to traverse the whole warp shed by the subsequent pick of the shuttle. This cutting is effected by the closure of the scissors 8—108 at a predetermined instant by the action of the abutment member 36 bearing against the rear end 332 of the lever 22 (Fig. 14) during the backward movement of the slay 1 during its next beat and possibly after the shuttle 5 has already been thrown from the box 201 and have traveled a certain distance through the warp (as diagrammatically shown in Fig. 1). By the successive forward beat-up movement of the slay, during which the shuttle 5 enters the box 101 on the loading side of the loom, the slay 1 abuts against the lever 46 which, through the lever 47 operates the loader 3 to introduce a full cop into the shuttle. At the end of the movement of the slay towards the breast beam, the abutment 42 depresses the lever 41 and frees the lever 38 which returns to its rest position, thus permitting the lever 46 to fall into its rest position. All the members of the device are thus returned into their original positions so that the reloading cycle of the shuttle is completed during three slay beats, while the shuttle does not traverse the warp when empty.

To avoid two cops being loaded into the shuttle at the same time, or a new cop being loaded upon the remnant of an old cop in the shuttle, as might occur on an accidental movement of the cop feeler 4 due to shocks or other irregular operation taking place during the shuttle loading, the invention provides a suitable safety device which automatically locks the cop feeler during the loading of a new cop in the shuttle.

Figure 17:
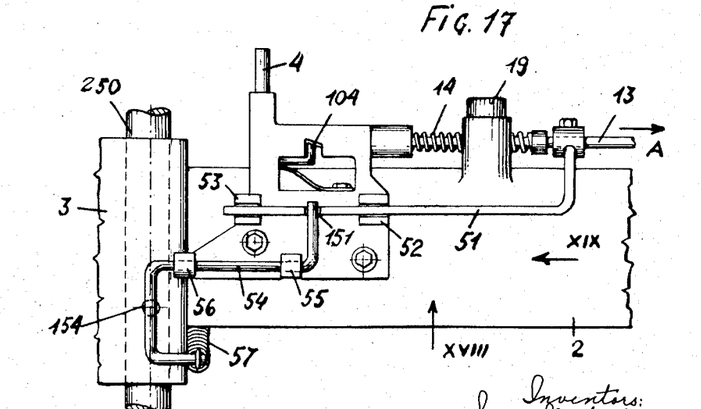
Fig. 17 shows in plan view the cop feeler-locking device.
Figure 18:
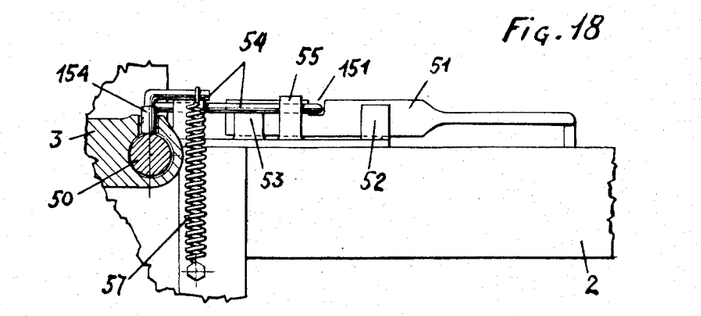
Figs. 18 and 19 are two views in elevation with parts in section on the arrow lines XVIII, XIX respectively in Fig. 17.
Figure 19:
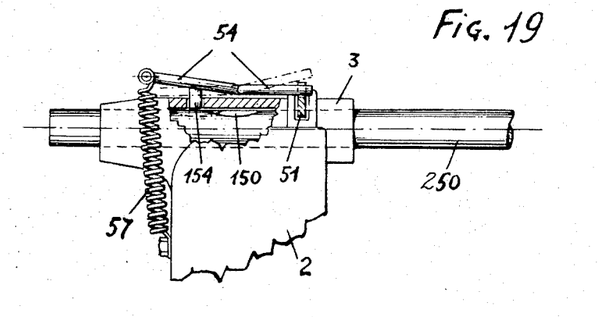

A preferred embodiment of such a safety device is shown by way of example in Figs. 17 to 19 in which a latch 51 is fastened to the rod 13; the latch 51 is slidably supported at 52 and 53 on the breast beam 2. The latch 51 has a notch 151 in which the end of a swinging lever 54 is engaged, the lever 54 being rotatably mounted at 55 and 56 on the breast beam 2. The lever 54 carries on its opposite end a pin 154 which penetrates into a loader 3 and is pressed by a spring 57 on an ejector 250 which slides in the full cop magazine (not shown) to eject a cop therefrom and introduce it into the shuttle. The ejector 250 has a recess 150 which is normally opposite the pin 154 and in which the pin 154 engages by action of a spring 57 and therefore the opposite end of the lever 54 rises and is disengaged from the notch 151 of the latch 51, thus leaving the rod 13 free for the normal operation of the cop feeler (see the positions shown by dotted lines in Fig. 19.)

When the ejector 250 is shifted axially for loading a full cop into the shuttle, the pin 154 leaves the recess 150 and comes into engagement with a cylindrical part of the ejector 250 (Figs. 18 and 19) and therefore by the action of the spring 57 depresses and engages the opposite end of the lever 54 in the notch 151 of the latch 51. The rod 13 is thus maintained temporarily locked during the loading of the shuttle and is not permitted to snap in the direction of arrow A, even if it is freed due to an accidental shifting of the feeler 4.

While one construction according to the invention has been described with reference to the accompanying drawings, it will be understood that any cop feeling device may be employed on the cop loading side of the loom which detects a cop remnant of predetermined length and operates the rod 13 as described. Further, any cop loading device may be employed from which full cops may be released by action of the feeling device as described.

What we claim is:

1. In an automatic loom for weaving operating with coreless cops which shorten in length as the weft is drawn therefrom and comprising a breast beam, a slay, a shuttle-loading device arranged on one side of the loom provided with means for the introduction into the empty shuttle of full cops, a cop feeler on said side detecting when the length of the weft cop is reduced to a predetermined minimum length, a shuttle box on the feeler side of the slay, a cop remain-extracting device and a weft thread-severing device arranged on the side of the loom opposite to the loader side, said extracting device being arranged on the side of the breast beam corresponding to the shuttle box of the slay, said extracting device being constituted by an extractor arm axially slidable in a swinging bearing bushing and is kept in its rest position by elastic spring means and adapted to be obliquely introduced with its pointed end into the shuttle and through the central bore of the weft cop remain through slots of the front walls of the shuttle and of the shuttle box and by action of a swinging lever carried by the slay, said lever being controlled by the beat up movement of the slay through action of an abutment on the loom frame and being engageable with a tooth of the extractor arm thus axially shifting this latter within the supporting bushing against pulling spring means, whereby when the extractor arm is introduced into the shuttle, it is locked with respect to the swinging bearing bushing by snapping spring means and temporarily coacts with a front arm of the slay, which causes same to swing during the rearward movement of the slay and extracts from the shuttle the point together with the weft cop remain, fixed abutments being provided which, at the end of each swinging movement of the extractor device by the extraction of the cop put out of action the locking means of the extractor arm with respect to the bearing bushing thus permitting of the extractor device returning to its rest position by action of the pulling spring means.

2. An automatic loom for weaving operating with coreless cops which shorten in length as the weft is drawn therefrom and comprising a slay, a shuttle-loading device provided with means for the introduction into the empty shuttle of full cops, a cop feeler detecting when the length of the weft cop is reduced to a predetermined minimum length and promoting the consecutive control of a cop remain-extracting device, a shuttle box on the feeler side of the slay with a slot in the front side thereof, a weft thread-severing device, the said extracting device comprising an extractor arm and a swingable lever for operating the same and the said severing device being arranged at the same loom side, the said shuttle-loading device and the said feeler being arranged at the opposite loom side, and in which the severing device is fitted on the slay in correspondence of the slot in the front side of the shuttle box and is constituted by scissors having a movable blade which is kept normally in closed position and can be opened by the forward movement of the slay by action of a front abutment member of the loom frame on a kinematic lever chain abutting thereto and kept in its opening or closing position by braking spring means, said scissors being adapted to be closed by the rearward movement of the slay by action of an adjustable rear abutment member fitted on the loom frame.

3. An automatic loom for weaving according to claim 2, in which the movements for the opening of the scissors and for the shifting of the swinging lever for the operation of the extractor arm are taken from the rearward swinging of a lever arm fulcrumed to the slay and coacting with the end of a control lever on the loom frame, said control lever being kept normally in a position in which it cannot abut against the said swinging arm of the slay, and is brought to an active position, in which it abuts against said arm upon forward movement of the slay when the cop feeler detects the reduction to a minimum length of the weft cop.

4. An automatic loom for weaving according to claim 2, in which the movements for the opening of the scissors and for the shifting of the swinging lever for the operation of the extractor arm are taken from the rearward swinging of a lever arm fulcrumed to the slay and coacting with the end of a control lever on the loom frame, said control lever being kept normally in a position in which it cannot abut against the said swinging arm of the slay, and is brought to an active position, in which it abuts against said arm upon forward movement of the slay when the cop feeler detects the reduction to a minimum length of the weft cop, whereby by the extraction swinging of the extractor device this latter acts by a projecting part of a member of the kinematic chain connecting the cop feeler device with the control lever of the extractor and of the severing device, thus bringing said control lever and the said cop feeler to their normal position.

5. An automatic loom for weaving according to claim 2, in which the movements of the opening of the scissors and for the shifting of the swinging lever for the operation of the extractor arm are taken from the rearward swinging of a lever arm fulcrumed to the slay and co-acting with the end of a control lever on the loom frame, said control lever being kept normally in a position in which it cannot abut against the said swinging arm of the slay, while it is brought to an active position, in which it abuts against said arm upon forward movement of the slay when the cop feeler detects the reduction to a minimum length of the weft cop, whereby the extractor arm is maintained normally parallel to the slay and bears against a movable abutment which is shifted by the cop feeler when this detects that the weft cop is reduced to a predetermined minimum length thus promoting the inclination of the extractor device by action of pulling spring means whereby said moveable abutment is brought to its rest position by a projection of the extractor device during the extraction swinging movement thereof.

6. An automatic loom for weaving operating with coreless cops which shorten in length as the weft is drawn therefrom and comprising a slay, a shuttle-loading device provided with means for the introduction into the empty shuttle of full cops, a cop feeler detecting when the length of the weft cop is reduced to a predetermined minimum length and promoting the consecutive control of a cop remain-extracting device, of a weft thread-severing device and of said shuttle-loading device; the said extracting device and the said severing device being arranged at the same loom side, while the said shuttle-loading device and the said feeler are arranged at the opposite loom side, and in which the said extracting device comprises a swinging arm operated by a swinging lever fulcrumed to the slay, means for swinging said lever during the extraction, a second lever which controls the cop-loading device on the other side of the loom; another lever controlled by said slay and acting so as to bring said second mentioned lever from a non-operating position, in which it cannot abut against the slay, to an operating position, in which it abuts against the slay by the successive pick thereof and promotes the operation of the loader and the introduction into the shuttle of a new cop, and means for locking the said second lever in its active position whereby said means are uncoupled, so as to permit the return of the whole device in its non-working position, at the end of the same pick which promotes the loading of a new cop.

7. A device according to claim 6, and comprising further stop and safety means for temporarily stopping for some time the means controlled by the cop feeler during the introduction of a full cop into the shuttle and means operatively connecting said locking device with said loading device, whereby said means comprise a cop ejector having a shaped part, a swinging lever located adjacent and coacting with said shaped part of the cop ejector and acting on the means controlled by the cop feeler and controlling the said extractor and severing device.

8. In an automatic loom for weaving having a slay provided with shuttle box and operating with coreless cops which shorten in length as the weft is drawn therefrom, a shuttle-loading device, a cop feeler detecting when the length of the weft cop is reduced to a predetermined minimum length, both said shuttle-loading device and said cop feeler being arranged on the same side of the loom, a cop extractor, a weft thread-severing device, both said cop extractor and said weft thread-severing devices being arranged on the same loom side opposite to the first-named side of the loom and having an idle position and an operative position, means controlled by said feeler for shifting the cop extractor and the weft thread-severing device from the idle position into operative position during a (first) pick, when the feeler feels that the cop remain in the shuttle has reached said predetermined minimum length, means operating said cop extractor and said weft thread-severing device during the subsequent (second) pick and at the same time for preparing the said cop-loading device for operation, and means operating said loading device so as to load a new cop into the empty shuttle by the next-subsequent (third) pick.

9. In an automatic loom for weaving, operating with coreless cops which shorten in length as the weft is drawn therefrom, and comprising a slay and a shuttle loading device, means provided on said shuttle loading device for introducing full cops into the empty shuttle, a cop feeler comprising a feeler bolt slidably mounted in an axial direction and detecting when the weft cop is reduced to a predetermined minimum length, both said shuttle loading device and said cop feeler being arranged on the same side of the loom, a cop remain-extracting device, a weft thread severing device, both said cop remain-extracting device and said weft thread severing device being arranged on the same loom side opposite to the first mentioned side of the loom, a shuttle box on the cop feeler side of the loom, an aperture in the front wall of said shuttle box, the front wall of the shuttle being provided with an aperture corresponding in position to the aperture in the shuttle box, a movable abutment member in the interior of said shuttle box, said abutment being sensible to the shortening in length of the weft cop, whereby said feeler bolt penetrates at each beat up of the slay, said front wall apertures of both the shuttle box and said shuttle to abut against said abutment member of the shuttle, whereby said feeler bolt is shifted against the action of yielding spring means when the length of the weft cop is reduced to a predetermined minimum, means controlled by said feeler bolt for operating said cop remain-extracting device and said weft thread severing device at the beginning of the same traverse of the shuttle from the extracting and severing device side of the loom to the opposite side of the loom, and means for operating the shuttle loading device and for loading the empty shuttle at the end of said traverse.

10. An automatic loom for weaving according to claim 9, in which the feeler bolt is connected to the stop tooth of a snap device which keeps the first member of a kinematic chain normally locked, the end member of which chain abuts at the opposite loom side against a lever for the control of the extracting and severing devices, whereby said stop tooth frees the first member of the kinematic chain permitting said control lever to be shifted to an active position by action of pulling spring means when the length of the cop is reduced to a minimum and when the feeler bolt is axially shifted by the movable abutment carried by the shuttle.

11. In an automatic loom according to claim 9, for weaving in which the movable abutment carried by the shuttle is fastened to an end of a longitudinal spring arm fitted to the interior on one of the shuttle walls and tending to lift itself from such wall by its own elasticity and being kept normally depressed by the weft cop, thus maintaining the movable abutment out of the path of the feeler bolt, whereby said arm is lifted by the exhaustion of the weft supply, thus carrying the movable abutment and keeping the same in an advanced position in which it may abut frontally against the feeler bolt by the subsequent slay pick.

12. An automatic loom for weaving according to claim 9, in which the front side of the shuttle box on the cop feeler side of the slay is movable and is normally retained by spring means at such a distance from the rear side as to permit with a certain play the free inlet and exit on the shuttle, while on the slay breast beam a spring abutment is provided which at each slay pick abuts against the movable side thus elastically shifting same back and locking temporarily the shuttle on the rear side.

References Cited in the file of this patent

FOREIGN PATENTS

| | | |
|---|---|---|
| 546,143 | Great Britain | June 30, 1942 |
| 632,245 | Great Britain | Nov. 18, 1949 |
| 661,751 | Great Britain | Nov. 28, 1951 |